(12) United States Patent  
Geraets

(10) Patent No.: US 8,397,902 B1  
(45) Date of Patent: Mar. 19, 2013

(54) APPARATUS FOR CONVEYING BULK MATERIALS

(75) Inventor: James M. Geraets, Sioux Falls, SD (US)

(73) Assignee: POET Research, Inc., Sioux Falls, SD (US)

(*) Notice: Subject to any disclaimer, the term of this patent is extended or adjusted under 35 U.S.C. 154(b) by 246 days.

(21) Appl. No.: 12/757,858

(22) Filed: Apr. 9, 2010

Related U.S. Application Data

(60) Provisional application No. 61/168,325, filed on Apr. 10, 2009.

(51) Int. Cl.
*B65G 31/04* (2006.01)

(52) U.S. Cl. ......... 198/641; 198/642; 198/300; 198/311

(58) Field of Classification Search .................. 198/300, 198/312, 318, 638, 641, 642, 311, 564
See application file for complete search history.

(56) References Cited

U.S. PATENT DOCUMENTS

| | | | | |
|---|---|---|---|---|
| 2,812,052 A * | 11/1957 | Doyer | ........................ | 198/626.6 |
| 3,195,711 A * | 7/1965 | Bogdan et al. | ................ | 198/612 |
| 3,380,717 A * | 4/1968 | Adams et al. | .................... | 366/18 |
| 3,413,401 A * | 11/1968 | Dillon et al. | ........................ | 373/4 |
| 4,055,265 A * | 10/1977 | Eisenman | ..................... | 414/327 |
| 4,135,614 A | 1/1979 | Penterman et al. | | |
| 4,619,531 A * | 10/1986 | Dunstan | ............................ | 366/3 |
| 4,813,839 A | 3/1989 | Compton | | |
| 4,820,108 A | 4/1989 | Kneer | | |
| 5,735,319 A | 4/1998 | McNamara et al. | | |
| 6,811,020 B2 | 11/2004 | Bailey | | |
| 6,948,610 B2 * | 9/2005 | Connor et al. | ................ | 198/642 |
| 7,228,954 B2 * | 6/2007 | DePaso | ......................... | 198/448 |
| 7,252,473 B2 | 8/2007 | Bailey | | |
| 8,033,384 B2 * | 10/2011 | Toews | ........................... | 198/617 |
| 2007/0295581 A1 * | 12/2007 | Ash | ............................... | 198/540 |

OTHER PUBLICATIONS

B&W Aumund Group. "Samson™ Bulk Material Receiving Unit", B&W Mechanical Handling Ltd., Cambridgeshire, United Kingdom, 2008, 24 pages.
WTW Americas. "Truck Unloading Station," Peterborough, ON Canada, published online at [http://www.wtwamericas.com/truck_unloading.htm], retrieved on Apr. 13, 2010, 1 page.
Bruks. "Chip Receiving Hopper", published online at [http://www.bruks.com/en/Products/Receiving/Hoppers/Chip-Receiving-Hopper/], retrieved on Apr. 14, 2010, 2 pages.
Bruks. "Waste Receiving Hopper", published online at [http://www.bruks.com/en/Products/Receiving/Hoppers/Waste-Receiving-Hopper/], retrieved on Apr. 14, 2010, 2 pages.
Swift Manufacturing Co. "Our Aggregate Products", Clara City, Minnesota, published online at [http://swiftmfg.com/#/aggregate-products/4532264125], retrieved on Apr. 13, 2010, 3 pages.

(Continued)

*Primary Examiner* — Gene Crawford
*Assistant Examiner* — Keith R Campbell
(74) *Attorney, Agent, or Firm* — Turocy & Watson, LLP

(57) ABSTRACT

A belt conveyor system is provided. Belt conveyor system comprises a belt conveyor comprising a first end and a second end. Belt conveyor system also comprises a first hopper located at the first end for loading bulk material onto the belt conveyor. Belt conveyor system also comprises a dispersion assembly on the second end, the dispersion assembly projects and radially disperses the bulk material onto a pile. Also provided is a belt conveyor apparatus for projecting bulk material onto a pile having a smooth profile. The belt conveyor apparatus comprises a dispersion assembly located at an unload end of a conveyor, the dispersion assembly comprises a dispersion roller and a structure for positioning the dispersion roller relative to the conveyor.

24 Claims, 12 Drawing Sheets

OTHER PUBLICATIONS

Weisgram Metal Fab, Inc. "Weisgram Metal Fab 4800 Series—Sugar Beet Piler", West Fargo, North Dakota, published online at [http://www.weisgram.com/bpgeneral.htm], retrieved on Apr. 13, 2010, 1 page.

Superior Industries, LLC. "PowerStacker® Conveyor", Morris, Minnesota, published online at [http://superior-ind.com/products/equipment/protable-conveyors/powerstacker], retrieved on Apr. 13, 2010, 1 page.

* cited by examiner

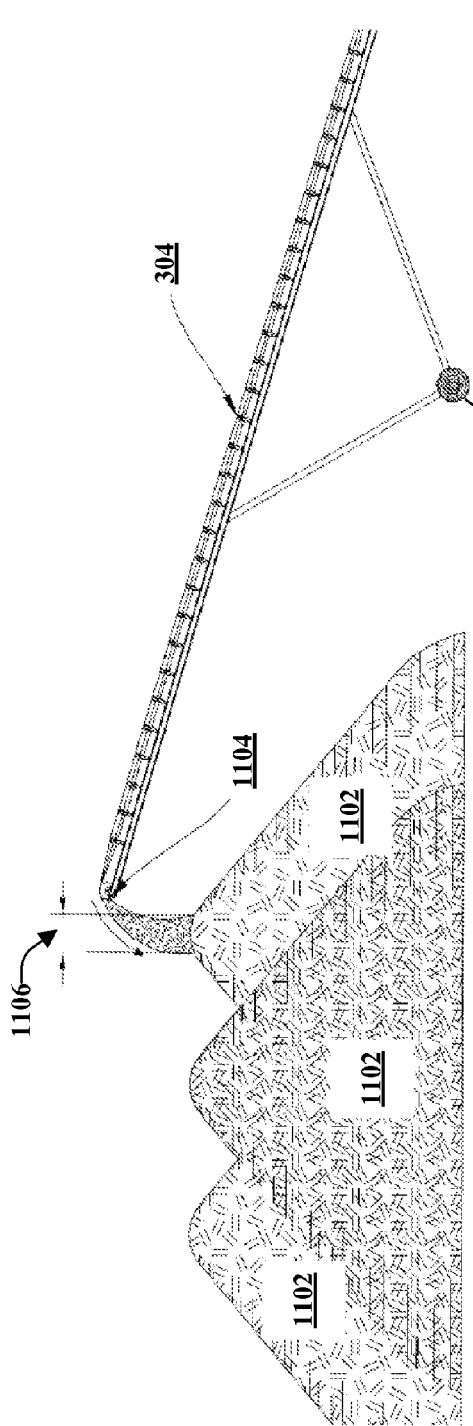
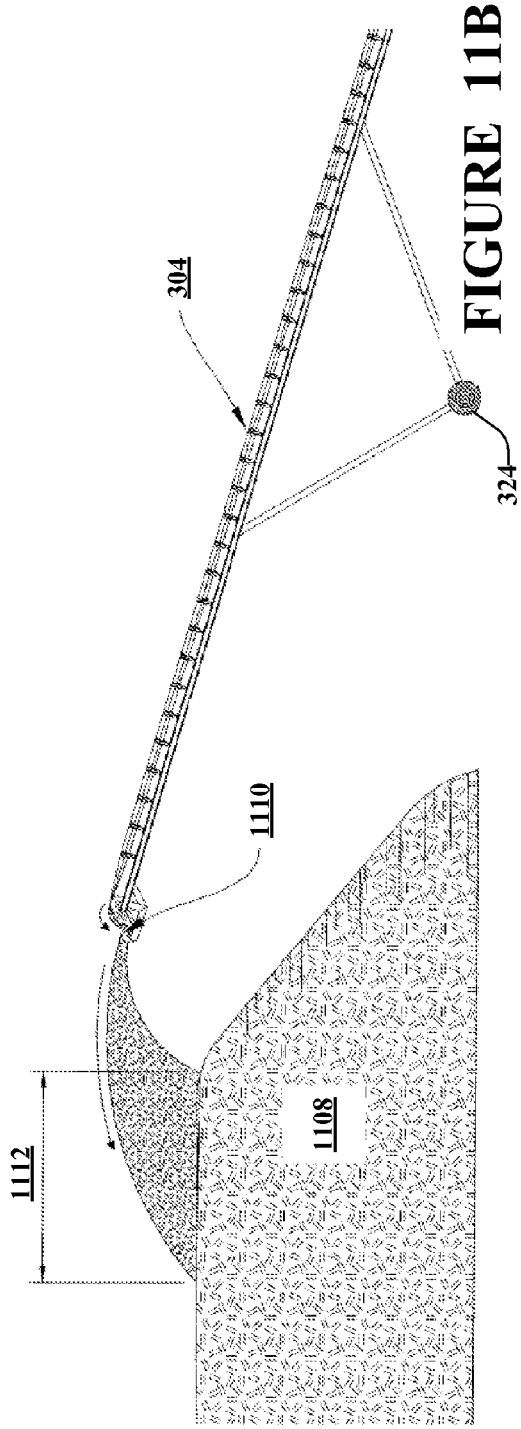

APPARATUS FOR CONVEYING BULK MATERIALS

CROSS REFERENCE TO RELATED APPLICATIONS

The present application claims priority to and incorporates by reference the following application: U.S. Provisional Application Ser. No. 61/168,325, titled "BELT CONVEYOR APPARATUS WITH BIOMASS DISPERSION ASSEMBLY", filed on Apr. 10, 2009.

FIELD

The present invention relates generally to an apparatus for conveying bulk materials. The present invention also relates to a belt conveyor system that can be utilized for use in a biorefinery environment. The present invention further relates to a belt conveyor apparatus that can produce piles having a crowned, smooth surface.

BACKGROUND

Bulk material can be moved to a location of use or storage in a transport container such as a tractor-trailer. When the transport container arrives at the location, the bulk material is unloaded from the transport container for storage or processing. A conveyor system may be used to aid the unloading process by moving material from the transport container into a storage or processing area.

Biomass is an example of bulk material. Biomass comprises plant matter that can be suitable for direct use as a fuel/energy source or as a feedstock for processing into another bioproduct (e.g., a biofuel such as cellulosic ethanol) produced at a biorefinery (such as an ethanol plant). Biomass may comprise, for example, corncobs and stover (e.g., stalks and leaves) made available during or after harvesting of the corn kernels. In order to be used or processed, biomass will be harvested and collected from the field and transported to the location where it is to be used or processed. Biomass (such as corncobs and stover) may be collected and stored in piles at the edge of the field. The piles of biomass are then collected and transported from the field to the location of intended use or processing.

In order to provide biomass to a lignocellulosic ethanol process, biomass may be delivered (e.g., by a truck and trailer or by other similar transportation means) to a storage location near the plant incorporating the process. Biomass may be stored in piles at the plant or at another location. In order to pile the biomass delivered to the storage site, a conveyor system may be used.

Bulk materials such as biomass when stored outside will realize material losses due to precipitation intrusion into the storage pile. Precipitation intrusion into the pile is enhanced when there are peaks and valleys or other surface irregularities on the pile which collect precipitation. Precipitation that collects on and penetrates the pile may increase the rate of decomposition of the bulk material resulting in material losses.

In conventional conveyors, conveyed material is dropped off the end of the belt, where gravity causes it to fall vertically onto the pile. This vertical fall results in a concentration of material below the end of the belt. When the height of the pile reaches the height of the end of the belt, the conveyor is moved in a longitudinal direction away from the pile so that material can continue to be added to the pile. This movement results in a pile having peaks and valleys as the conveyor is moved and material is added to the pile. These surface irregularities can be further enhanced as the bulk material in the pile settles over time.

Conventional conveyors typically receive material from a single trailer at any one time at their receiving systems. With the ability to receive only a single trailer, such conveyors are not able to operate and process material between loads, i.e. the time during which one trailer has been emptied and another trailer is positioned for unloading.

It would be advantageous to provide for a belt conveyor apparatus for movement of biomass from the transport container to a storage area. It would also be advantageous to provide for a belt conveyor apparatus that forms a biomass pile that has a substantially crowned, continuous (e.g. smooth) outer surface. It would be further advantageous to provide for a conveyor that has a high capacity for unloading bulk material in a continuous manner.

SUMMARY

The present invention relates to a belt conveyor system, comprising: a belt conveyor comprising a first end and a second end; a first hopper located at the first end for loading bulk material onto the belt conveyor; and a dispersion assembly on the second end, the dispersion assembly projects and radially disperses the bulk material onto a pile.

The present invention also relates to a belt conveyor apparatus for projecting bulk material onto a pile having a smooth profile. The belt conveyor apparatus comprising: a dispersion assembly located at an unload end of a conveyor, the dispersion assembly comprises a dispersion roller and a structure for positioning the dispersion roller relative to the conveyor.

DESCRIPTION OF THE DRAWINGS

FIGS. 11A and 11B are schematic side views of the belt conveyor apparatus.

DESCRIPTION OF THE EMBODIMENTS

Figure 1A:
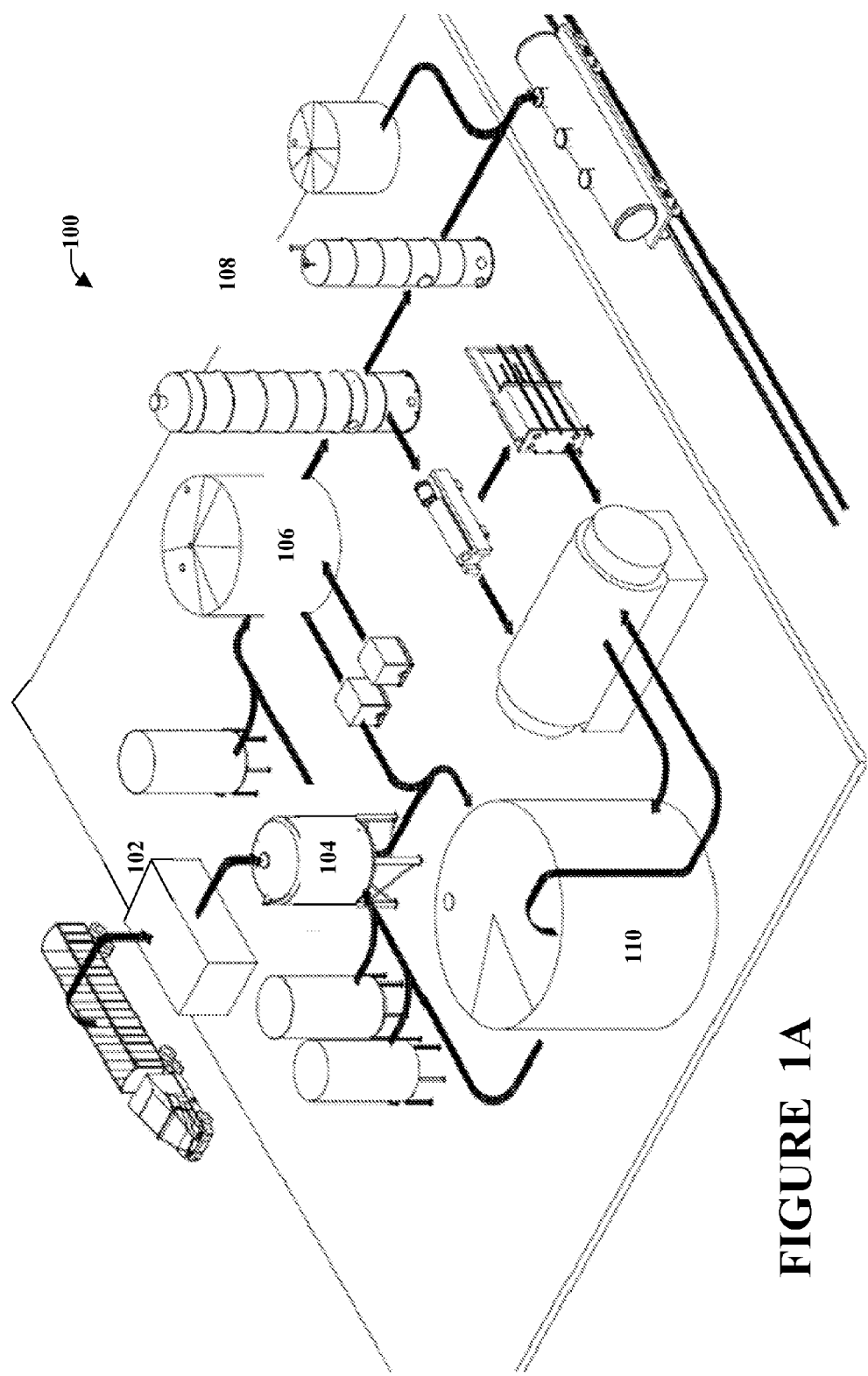
FIGS. 1A and 1B are schematic diagrams of biorefineries.

Referring to FIG. 1A, a biorefinery 100 configured to produce ethanol from biomass is shown. According to an exemplary embodiment, the biorefinery is configured to produce ethanol from biomass in the form of a lignocellulosic feedstock such as plant material from the corn plant (e.g. corn cobs and corn stover). Lignocellulosic feedstock such as lignocellulosic material from the corn plant comprises cellulose (from which C6 sugars such as glucose can be made available) and/or hemicellulose (from which C5 sugars such as xylose and arabinose can be made available).

As shown in FIG. 1A, the biorefinery 100 comprises an area where biomass is delivered and prepared to be supplied to the cellulosic ethanol production facility. The cellulosic ethanol production facility comprises apparatus for preparation 102, pre-treatment 104 and treatment of the biomass into treated biomass suitable for fermentation into fermentation product in a fermentation system 106. The facility comprises a distillation system 108 in which the fermentation product is distilled and dehydrated into ethanol. As shown in FIG. 1A, the biorefinery may also comprise a waste treatment system 110 (shown as comprising an anaerobic digester and a generator). Biomass delivered to the biorefinery may also be used in generating steam or energy, for example by feeding the biomass to a solid fuel boiler.

Figure 1B:
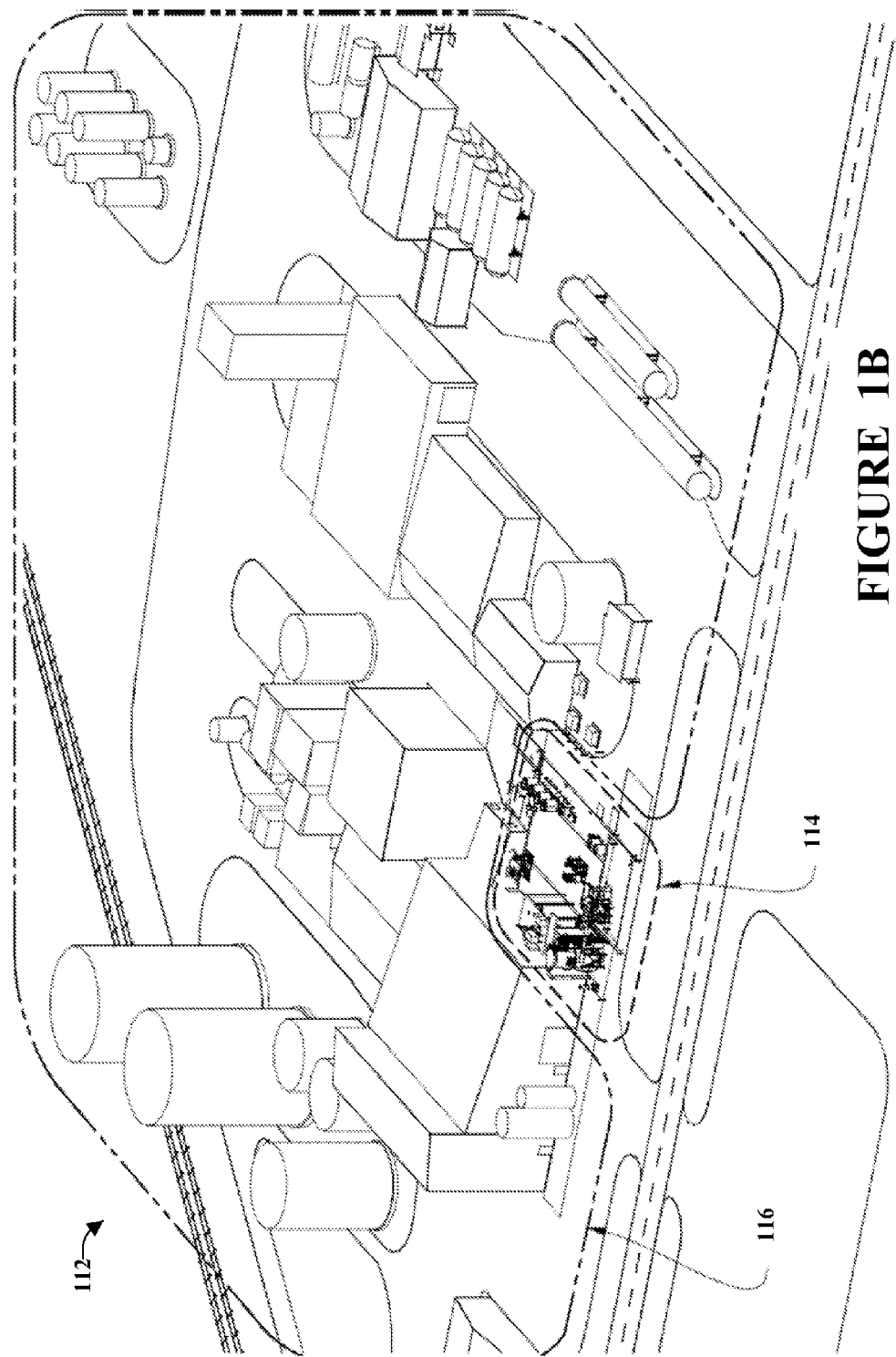

As shown in FIG. 1B, according to an exemplary embodiment, a biorefinery 112 may comprise a cellulosic ethanol production facility 114 (which produces ethanol from lignocellulosic material and components of the corn plant) co-located with a corn-based ethanol production facility 116 (which produces ethanol from starch contained in the endosperm component of the corn kernel). According to other alternative embodiments, a biorefinery (e.g. a cellulosic ethanol production facility) may be co-located with other types of plants and facilities, for example an electric power plant, a waste treatment facility, a lumber mill, a paper plant or a facility that processes agricultural products.

Figure 2:
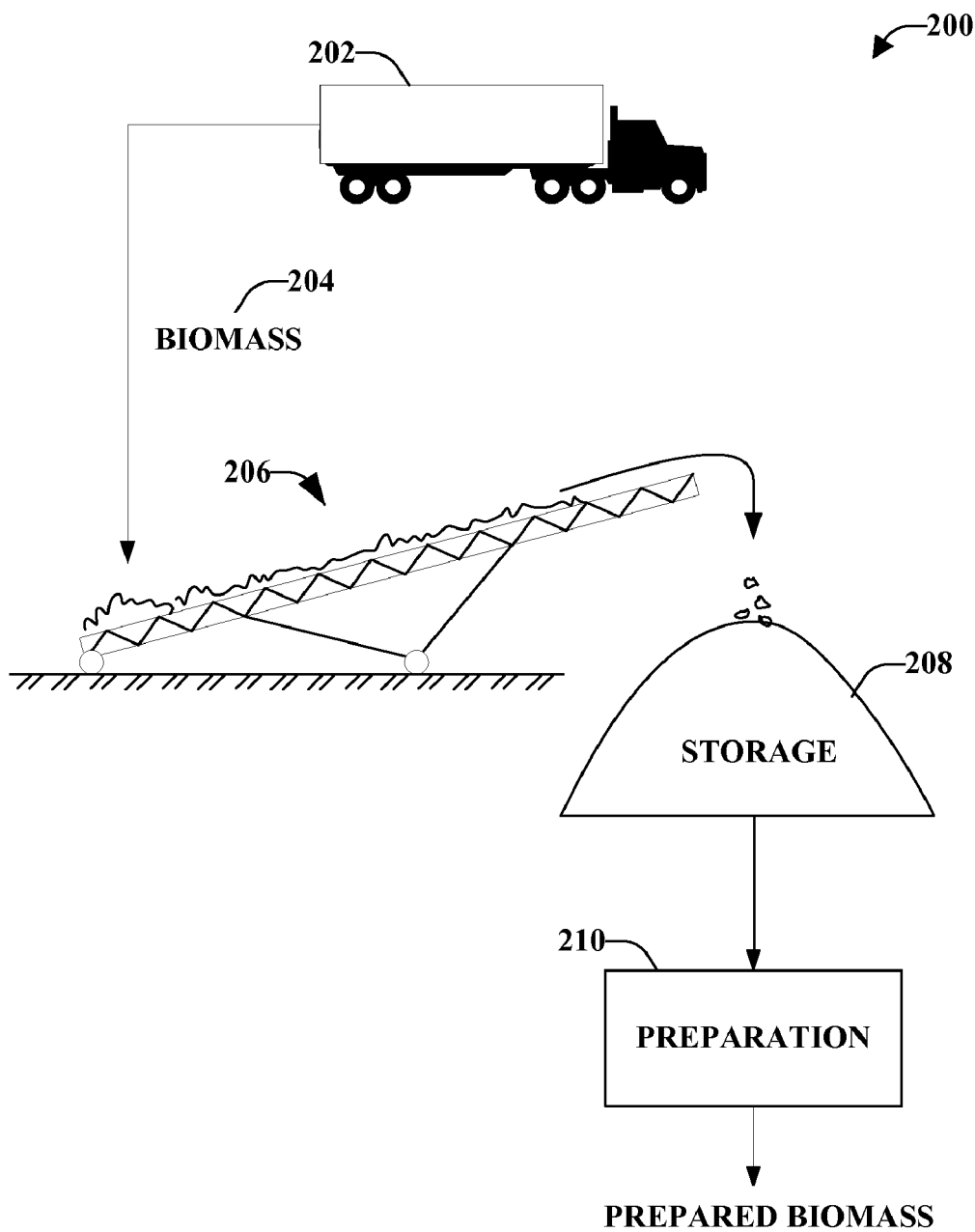
FIG. 2 shows a system for delivery and preparation of biomass at a biorefinery.

Referring to FIG. 2, a system 200 for delivery and preparation of biomass at the biorefinery is shown. A transport vehicle 202 can deliver the biomass 204 to the biorefinery. A biomass preparation system may comprise apparatus for receipt/unloading of the biomass 204, cleaning (i.e. removal of foreign matter), grinding (i.e. milling, reduction or densification), and transport and conveyance for processing at the plant. A belt conveyor apparatus 206 can be utilized to move the biomass 204 to storage 208. According to an exemplary embodiment, biomass in the form of corn cobs and stover may be delivered to the biorefinery and stored (e.g. in bales, piles or bins, etc.) and managed for use at the facility. According to an exemplary embodiment, biomass may comprise corn cobs, corn stover, and husks (e.g. leaves). Biomass particles may be uneven in size (e.g. ranging from less than 1 cm to more than 15 cm in diameter or length) and texture, and typically exhibit nesting and bridging characteristics, which may cause problems with flow ability. According to a preferred embodiment, the biomass may comprise at least 20 to 30 percent corn cobs (by weight) with corn stover and other matter. According to other exemplary embodiments, the preparation system 210 of the biorefinery may be configured to prepare any of a wide variety of types of biomass (i.e. plant material) for treatment and processing into ethanol and other bioproducts at the plant.

Referring to FIGS. 3 through 11B, exemplary embodiments of a belt conveyor apparatus are disclosed. Belt conveyor apparatus can be employed to create a biomass pile that has a substantially crowned, continuous outer surface. The biomass pile surface can mitigate precipitation intrusion into the biomass pile, which can mitigate biological decomposition of the biomass pile. In accordance with an embodiment, the belt conveyor apparatus can produce biomass piles at a high-capacity.

To provide feedstock to an ethanol production facility, biomass is delivered to the biomass facility by a transport vehicle such as a tractor-trailer or other transportation means. In comparison to starch-based ethanol production, cellulosic ethanol production requires a higher volume of feedstock. In an example, a cellulosic biorefinery should have a conveyor system that is capable of conveying material in an amount of at least approximately 1500 bone dry tons per day. In accordance with some embodiments, a conveyor system capable of conveying as much as 4500 bone dry tons per day of material is needed. The amount of material that should be conveyed is a function on the number of days per year in which the material can be delivered and conveyed as well as the quantity of feedstock needed by the biorefinery. A manner of storing a large quantity of biomass is by forming a biomass pile though the use of a conveyor system, for example.

Conventional material conveyors receive biomass from a single trailer and thus, are not able to operate and process biomass between loads or dumps, which is the time during which one trailer has been emptied and is removed from the conveyor and another trailer is positioned by the conveyor for unloading. For a cellulosic ethanol process, which requires a high quantity of material, a conveyor with the ability to receive material from multiple sources (e.g., two or more transport vehicles) at one time is desirable. Receiving material from multiple sources can allow the conveyor to be operated continuously, or substantially continuously, which can increase the rate at which biomass is conveyed from the transport vehicles to the biomass pile.

Further, material that is conveyed by conventional conveyors reaches the end of the conveyor and can fall to the pile in a substantially vertical motion. The substantially vertical fall of the material, combined with the weight of the material, can result in compaction of the material when it hits the pile (e.g., if the material is of a type that compacts, such as biomass). There can also be localized build-up of material below the end of the conveyor if the conveyor remains stationary with respect to the pile. When the pile height reaches the height of the conveyor, the entire conveyor may be moved in a longitudinal direction away from the pile so that operation of the conveyor can continue and additional material can be added to the pile. The iterative conveyor movement can produce a pile that has a profile with surface irregularities (e.g., peaks and valleys) that can be caused as the conveyor is moved and material is added to the pile. The surface irregularities can cause precipitation to collect in the pile. In contrast, a pile that has a crowned and smooth surface can cause precipitation to run off the pile rather than collecting in the pile. Precipitation that collects on and penetrates the pile can increase a rate of decomposition of the material.

Figure 3:
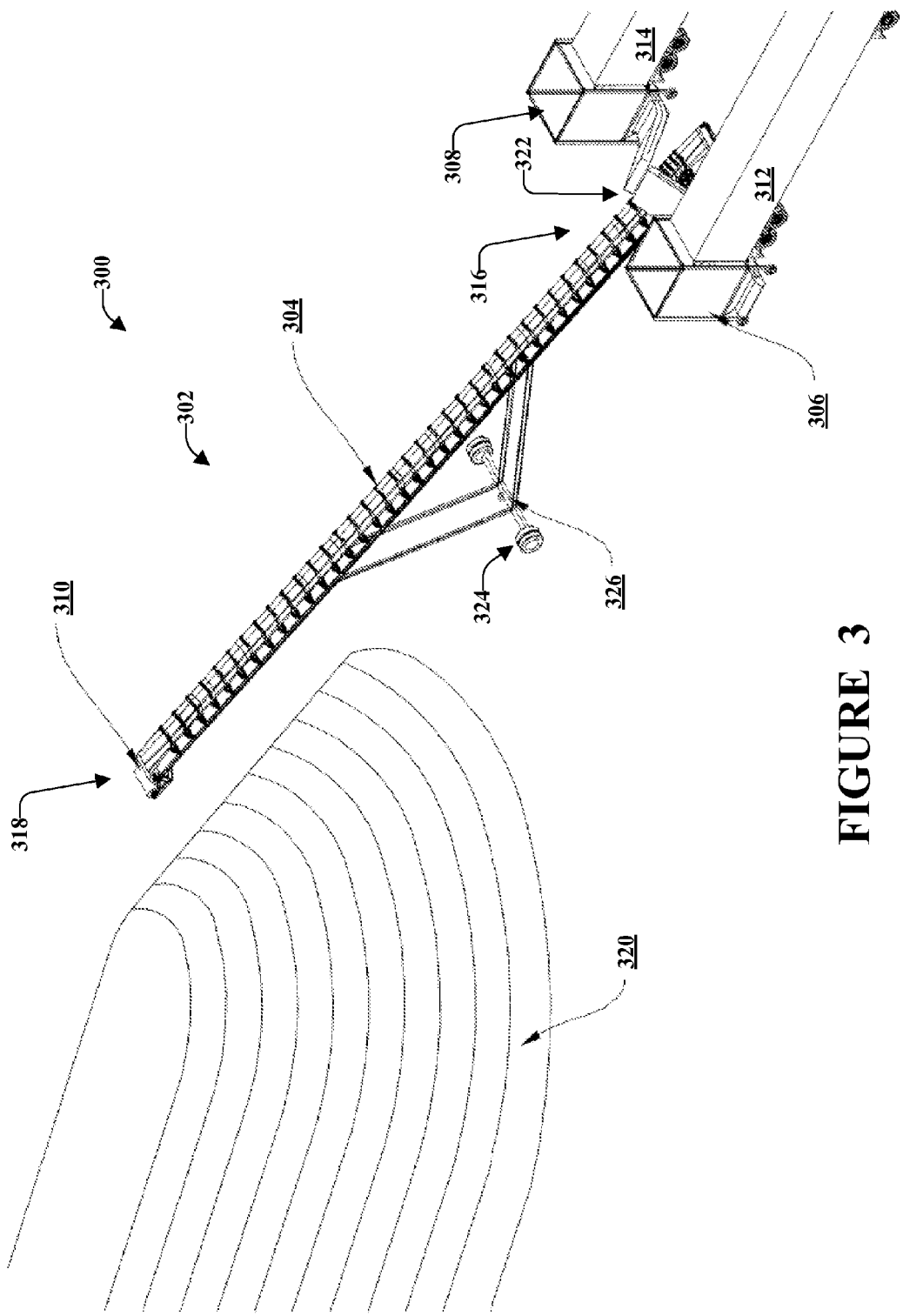
FIG. 3 is a schematic perspective view of a belt conveyor apparatus according to an embodiment.

Referring to FIG. 3, a system 300 for receiving and conveying bulk material (e.g. biomass) is shown. According to an embodiment, the conveyor system comprises a conveyor, one or more hoppers and a dispersion mechanism. The conveyor system can be used to receive bulk material from transportation vehicles and to convey and disperse it onto a storage pile. The conveyor comprises a first end that is supported against or near the ground and a second end that is suspended in the air. The conveyor comprises a wheeled support structure near the center of the conveyor. The wheeled support structure may be motorized and can be used to position the conveyor such that material is conveyed into a pile at a desired location. The conveyor may also comprise a dispersion system that disperses conveyed bulk material onto the pile resulting in a smooth, crowned shape of the pile.

Referring to FIGS. 3 through 11B a belt conveyor apparatus 302 includes a belt conveyor 304. Belt conveyor apparatus 302 can also include a single hopper system or a dual hopper system, shown as a first hopper 306 and a second hopper 308 located on opposite sides of belt conveyor 304. Also included in belt conveyor apparatus 302 is a dispersion assembly 310 that is configured to project and radially disperse material from belt conveyor 304. Dispersion assembly can be configured to move about a rotating axis, to horizontal to the belt conveyor, and/or move vertically to the belt conveyor.

For example, material falls from conveyor belt 304 onto dispersion assembly 310, which projects and radially disperses the material. In an embodiment, dispersion of biomass over a biomass pile causes the biomass to create a pile that has a substantially crowned, continuous surface that can be less susceptible to penetration of precipitation as compared to biomass piles formed by conventional techniques. Although the various embodiments are described herein with respect to conveying biomass, it should be understood that the disclosed embodiments are not limited to biomass and the various embodiments can be employed to convey other materials.

Biomass can be delivered to a biorefinery by transport vehicles, shown as a first transport vehicle 312 and a second transport vehicle 314. First hopper 306 can be utilized to receive biomass from first transport vehicles 312 and second hopper 308 can be utilized to receive biomass from second transport vehicle 314. First hopper 306 and second hopper 308 are configured to deliver the biomass to belt conveyor 304. The supply of biomass to the belt conveyor can alternate between first hopper and second hopper (depending on which hopper has biomass available for delivery to the belt conveyor) in order to increase throughput. The biomass is loaded onto belt conveyer 304 at a first end 316 (e.g., input end) and conveyed to a second end 318 (e.g., unload end). Upon reaching second end 318, the biomass contacts dispersion assembly 310 and is projected from belt conveyor 304 and onto a biomass pile 320.

In accordance with an embodiment, belt conveyor 304 is supported against a ground surface by a wheel assembly 322 located at first end 316 and by a wheeled support structure 324 located near a longitudinal center of belt conveyor 304. Wheeled support structure 324 can include a hydraulic motor 326 configured to operate a motorized wheel for moving belt conveyor 304. Motorized wheel can be activated to move belt conveyor 304 in a forward direction or a rearward direction, in a path that corresponds to a longitudinal orientation of belt conveyor 304. For example, during operation, once biomass pile 320 has reached a desired size, belt conveyor 304 can be moved longitudinally away from biomass pile 320 in order to continue adding material without increasing a height and width of biomass pile 320.

Wheeled support structure 324 can also comprise a steering mechanism that can move belt conveyor apparatus 302 into an initial position or to change position of belt conveyor apparatus 302. In accordance with some embodiments, belt conveyor apparatus 302 can be self-propelled and/or self-contained. For example, belt conveyor apparatus 302 can include an engine or other power source that provides power to motorized wheel for moving belt conveyor apparatus 302 and the operation of the belt conveyor components. According to some embodiments, belt conveyor apparatus 302 includes an operator's station from which the belt conveyor apparatus 302 can be monitored and operated.

Figure 4:
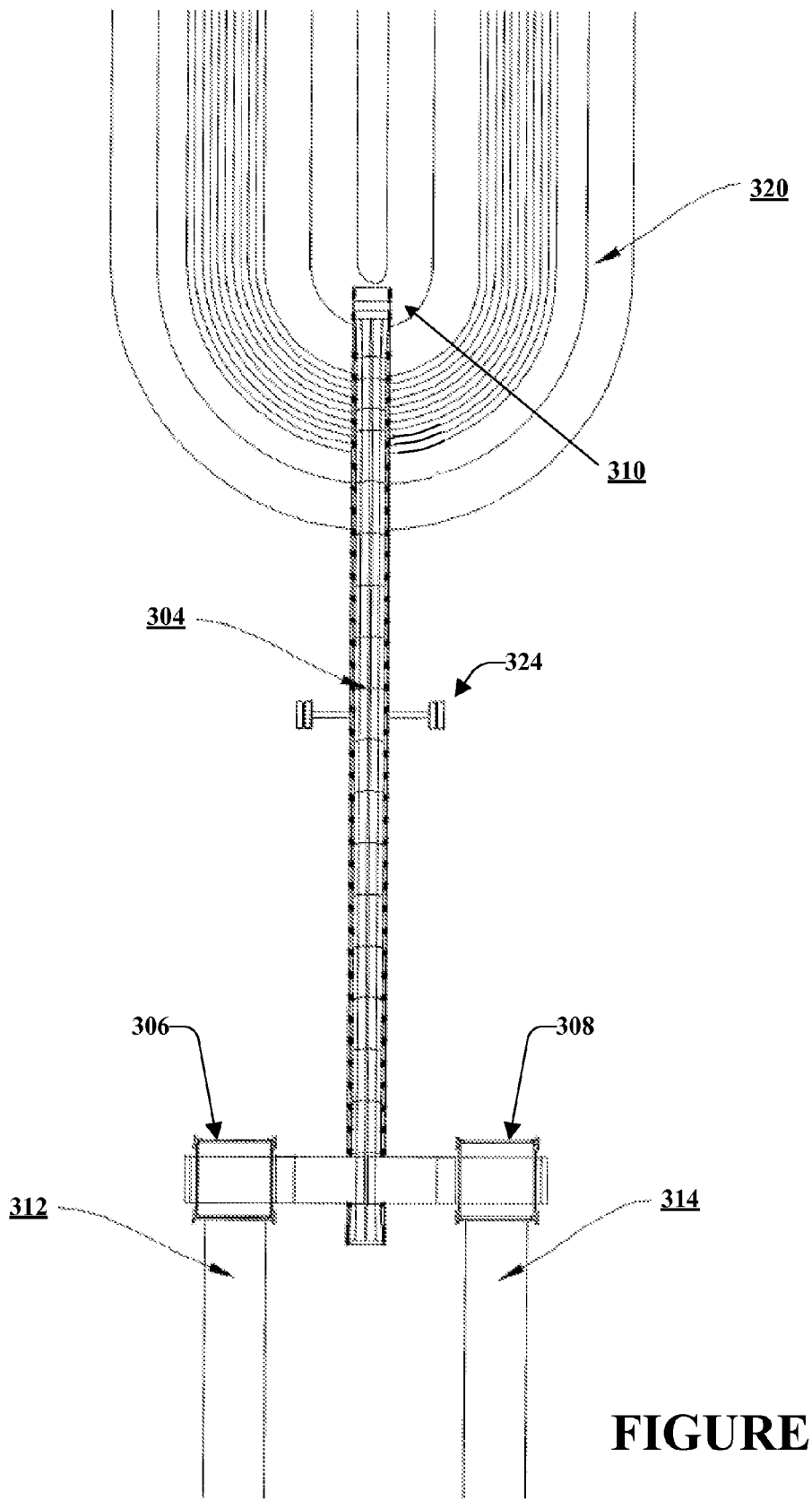
FIG. 4 is a schematic top view of an embodiment of the belt conveyor apparatus.

As show in FIGS. 3 through 6, first hopper 306 and second hopper 308 can be utilized to transfer biomass from first transport vehicle 312 and second transport vehicle 314, respectively. First hopper 306 and second hopper 308 can include an enclosed portion for receiving (or holding) biomass 502 and a conveying portion for conveying the biomass to belt conveyor 304. As shown in FIG. 4, the conveying system that conveys material from the hopper onto the conveyor may comprise a box conveyor or a drag conveyor. In an example, a box chain or industrial welded chain (such as Rexnord WDHR480 series welded chain available from Rexnord of Charleston, S.C.) can be utilized to convey biomass from enclosed portion of the hopper to the belt conveyor. The box chain can be a two box chain feed 504 or a one drag chain feed 506. In accordance to an embodiment, a first chain feed can be at least partially inside first hopper 306 and a second chain feed can be at least partially inside second hopper 308. First chain feed and second chain feed can be configured to guide biomass 502 onto belt conveyor 304.

Figure 5:
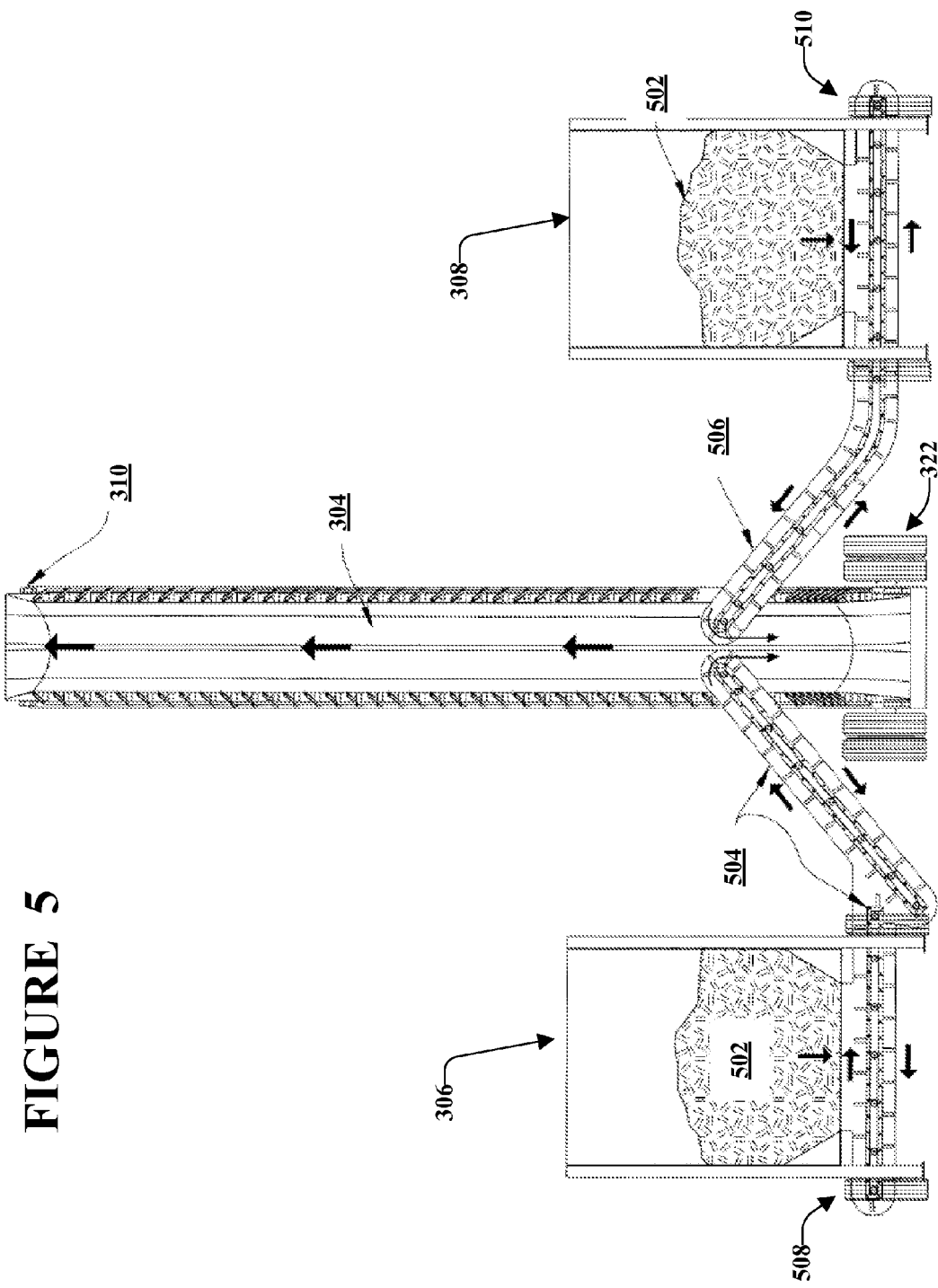
FIG. 5 is a schematic end view of an embodiment of the belt conveyor apparatus.
Figure 6:
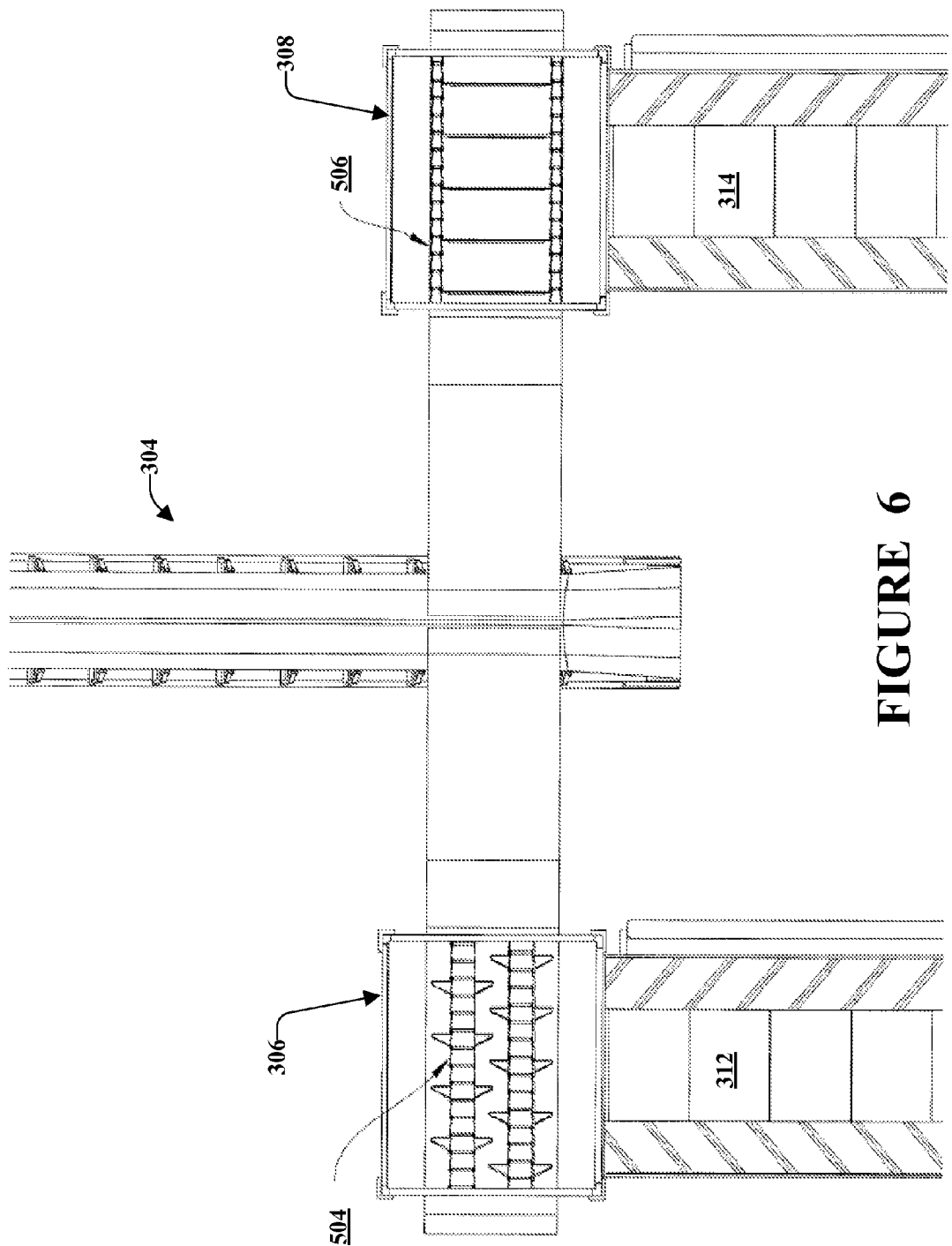
FIG. 6 is a schematic top view of an input portion of the belt conveyor apparatus.
Figure 7:
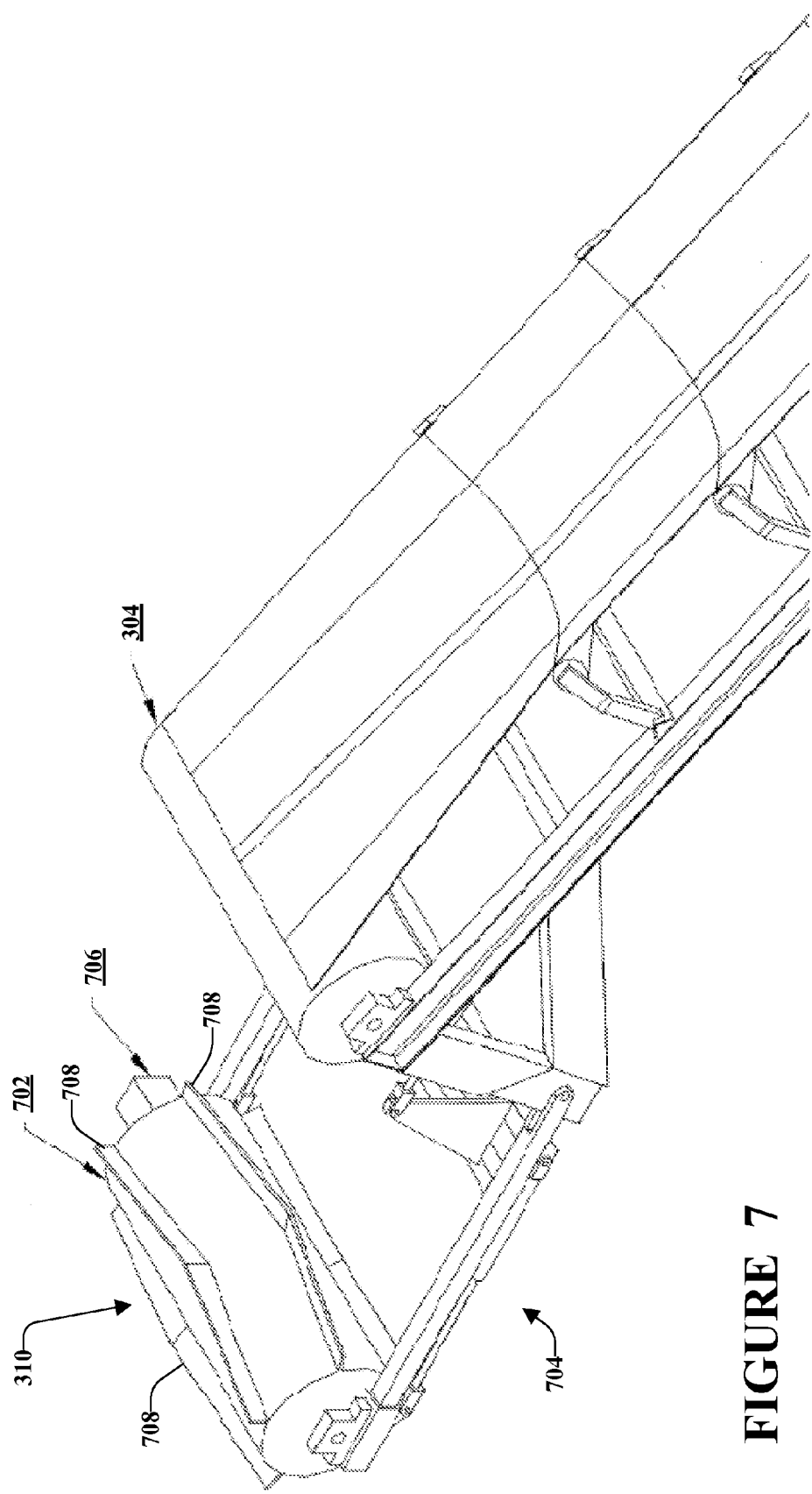
FIG. 7 is a schematic perspective view of a dispersion portion of the belt conveyor apparatus.
Figure 8:
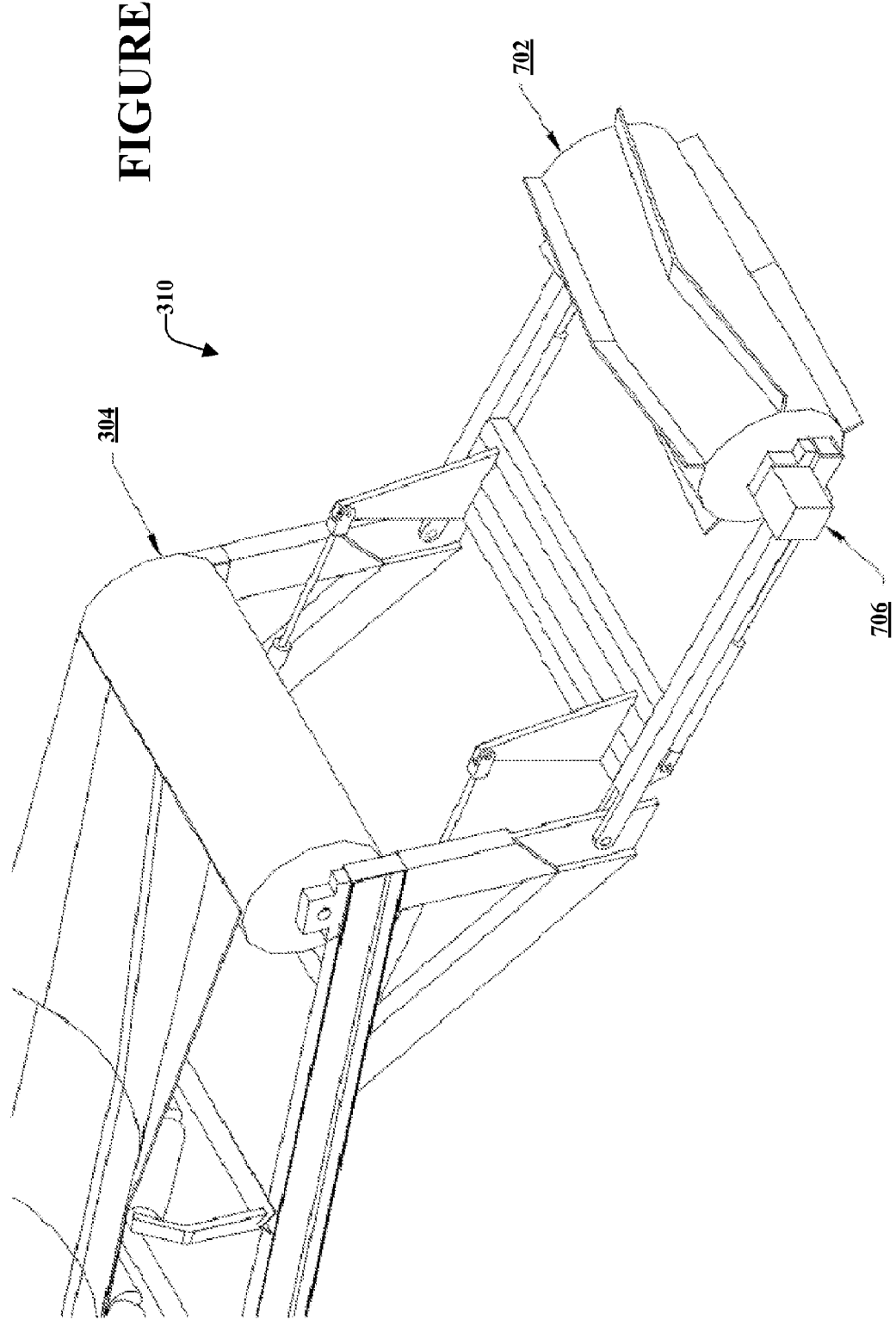
FIG. 8 is another schematic perspective view of the dispersion portion of the belt conveyor apparatus.
Figure 9:
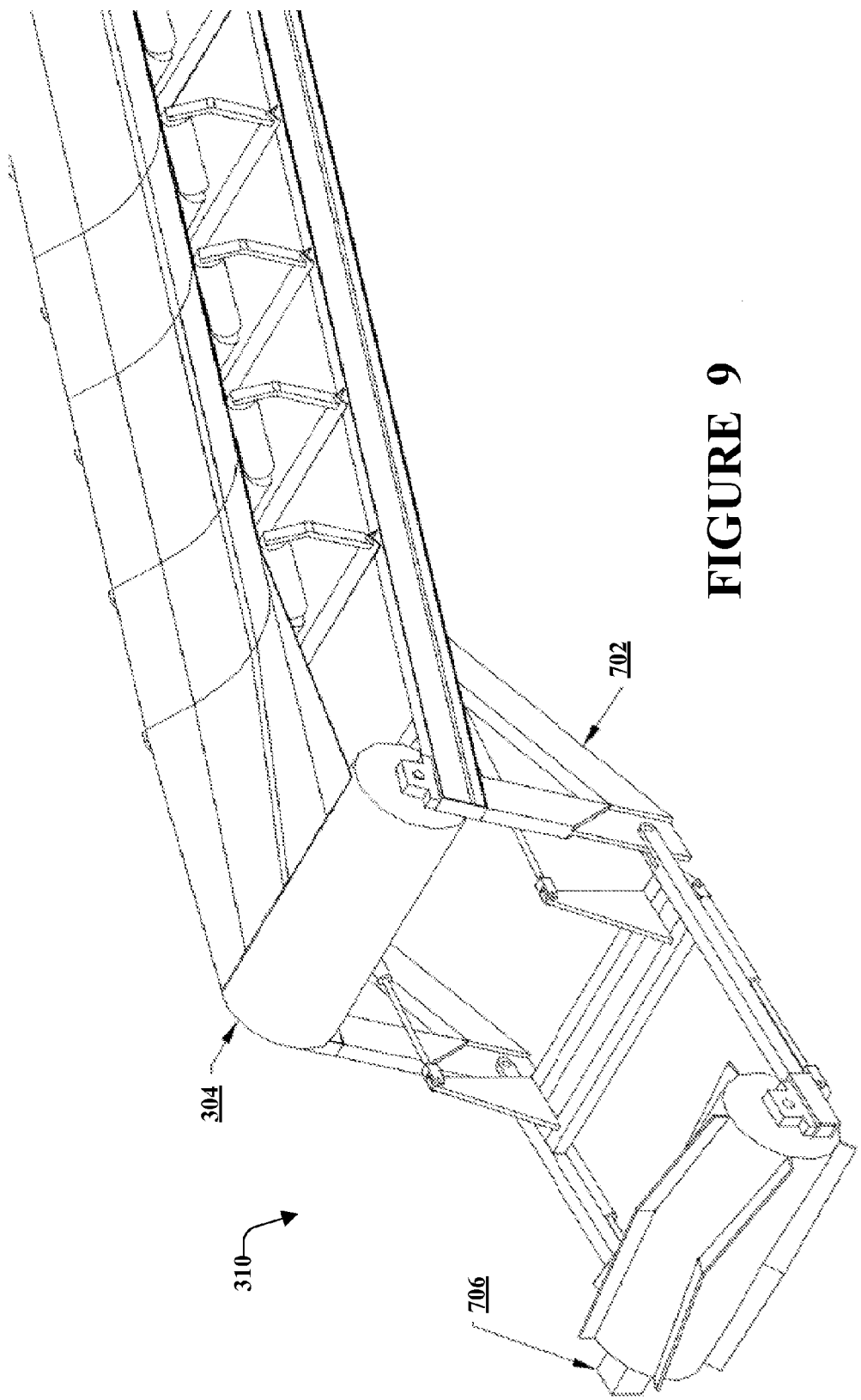
FIG. 9 is a further schematic perspective view of the dispersion portion of the belt conveyor apparatus.

As shown in FIG. 5, conveying portion of hopper can comprise a split conveying mechanism or a continuous conveying mechanism. In an embodiment of the present invention, a two-hopper receiving system with integral feed to the conveyor belt is used to increase capacity of belt conveyor apparatus. Capacity can be increased by allowing a first transport vehicle to deliver its load at substantially the same time as a second transport vehicle is moved into position to deliver its load. According to an embodiment, biomass from each hopper (or each transport vehicle) can be delivered to belt conveyor apparatus at substantially the same time. First hopper 306 and second hopper 308 can each be supported against the ground by a wheeled structure 508, 510.

As shown in FIGS. 7 through 11B, a dispersion assembly 310 is located at a second end 318 of belt conveyor 304. Dispersion assembly 310 can include a powered dispersion roller 702 and a structure 704 for positioning dispersion roller 702 with respect to belt conveyor 304. According to an embodiment, dispersion roller 702 is powered by a hydraulic motor 706. In an embodiment, dispersion roller 702 has longitudinal fins 708 that engage and throw material that contacts dispersion roller 702. According to an embodiment, longitudinal fins 708 are positioned underneath belt conveyer 304 and provide a broader dispersion of biomass, which can mitigate peaks and valleys at the top the pile and encourage water runoff during rainstorms or snowmelt.

Figure 10A:
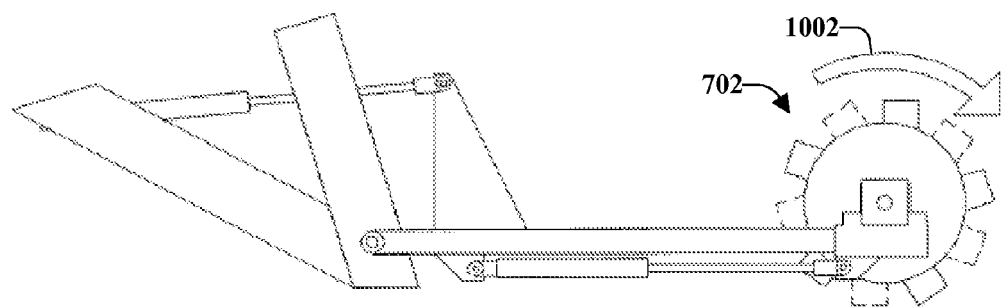
FIGS. 10A through 10C are schematic side views showing articulation of the dispersion portion of the belt conveyor apparatus with a dispersion assembly according to an embodiment.

During operation, dispersion roller 702 spins on an axis, as shown in FIG. 10A, and is positioned so that material leaving belt conveyor 304 contacts dispersion roller 702. Material that falls on the dispersion roller 702 is radially dispersed from belt conveyor apparatus 302, as shown in FIG. 11B. In accordance with an embodiment, dispersion roller can spin at a variable rotational speed.

Figure 10B:
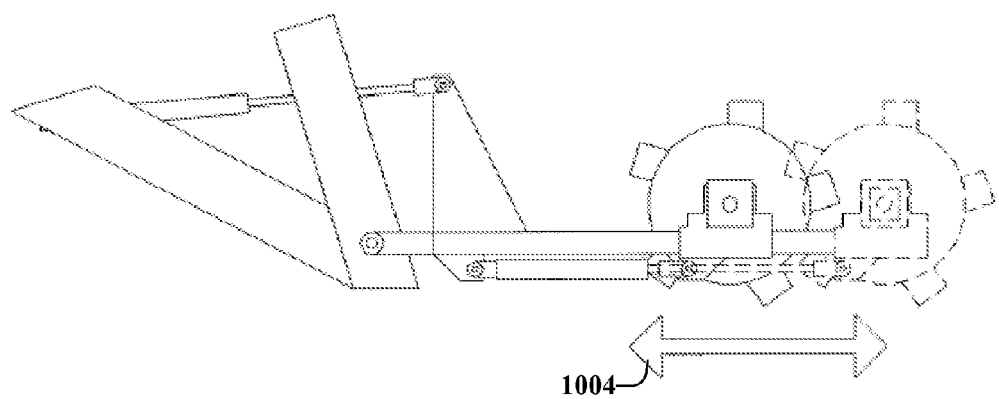
Figure 10C:
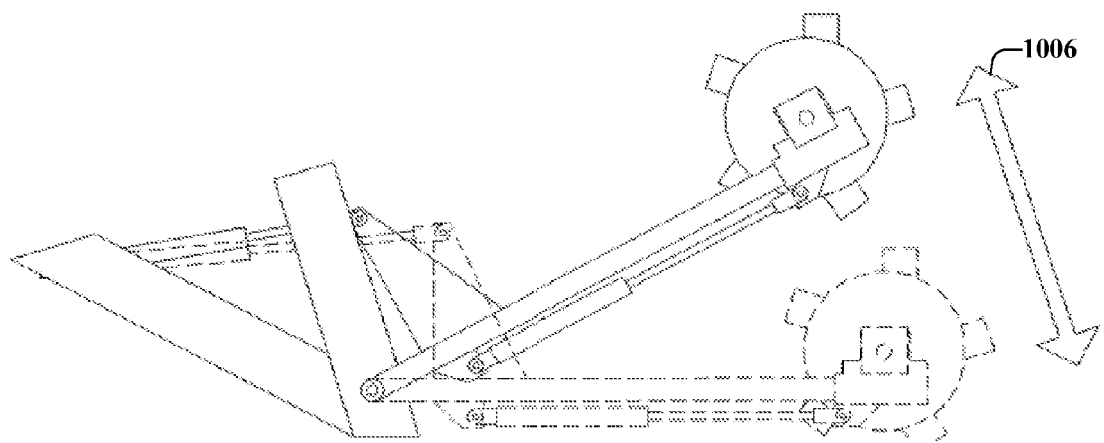

FIGS. 10A through 10C illustrate multiple degrees of movement of dispersion assembly 310. FIG. 10A shows a rotating axis 1002 around which dispersion assembly 310 can rotate. Dispersion roller 702 can be moved toward or away from second end 318 of belt conveyor 304, as shown by the horizontal movement 1004 in FIG. 10B. FIG. 10C illustrates the vertical movement 1006 of dispersion roller 702.

Side views of an embodiment of the belt conveyor apparatus 302 with biomass dispersion assembly are shown in FIGS. 11A and 11B. According to an exemplary embodiment, the dispersion mechanism may facilitate the formation of piles with a smooth, continuous and substantially crowned shape that may help direct precipitation off the pile, thus helping to prevent material losses of biomass due to excess moisture and decomposition. FIG. 11A illustrating the profile of biomass piles 1102 produced by a belt conveyor without a dispersion assembly. An angle of projection 1104 of the biomass into the biomass pile 1102 is substantially vertical with respect to the belt conveyor apparatus, resulting in a narrow dispersion 1106 of the biomass onto the biomass piles 1102. FIG. 11B illustrates the smooth profile of a biomass pile 1108 produced by a belt conveyor with a dispersion assembly 1110. As shown, dispersion assembly 1110 disperses the biomass over a larger area 1112 as compared to the narrow dispersion 1106 created without a dispersion assembly. The continuous surface profile of the biomass pile 1108 produced by a belt conveyor having a dispersion assembly demonstrates a smooth, crowned shape that can direct precipitation off the pile.

The word "exemplary" is used to mean serving as an example, instance, or illustration. Any embodiment or design described as "exemplary" is not necessarily to be construed as preferred or advantageous over other embodiments or designs, nor is it meant to preclude equivalent exemplary structures and techniques known to those of ordinary skill in the art. Rather, use of the word exemplary is intended to present concepts in a concrete fashion, and the disclosed subject matter is not limited by such examples.

The term "or" is intended to mean an inclusive "or" rather than an exclusive "or." To the extent that the terms "comprises," "has," "contains," and other similar words are used in either the detailed description or the claims, for the avoidance of doubt, such terms are intended to be inclusive in a manner similar to the term "comprising" as an open transition word without precluding any additional or other elements.

It is important to note that the construction and arrangement of the elements of the disclosed subject matter as described in the detailed description and as shown in the figures is illustrative only. Although some embodiments have been described in detail, those skilled in the art who review the disclosure will readily appreciate that many modifications are possible (e.g. variations in size, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed, the operation of the interfaces may be reversed or otherwise varied, the length or width of the structures and/or members or connectors or other elements of the system may be varied, the nature or number of adjustment positions provided between the elements may be varied. It should be noted that the elements and/or assemblies of the system might be constructed from any of a wide variety of materials that provide sufficient strength or durability, in any of a wide variety of colors, textures and combinations. Accordingly, all such modifications are intended to be comprised within the scope of the disclosed subject matter. Other substitutions, modifications, changes and omissions may be made in the design, operating conditions and arrangement of the exemplary embodiments without departing from the spirit of the present invention.

What is claimed is:

1. A belt conveyor system, comprising:
    a belt conveyor comprising a first end and a second end;
    a first hopper located at the first end for loading bulk material onto the belt conveyor; and
    a dispersion assembly on the second end, the dispersion assembly projects and radially disperses the bulk material onto a pile, wherein the dispersion assembly moves horizontally in a direction outward from the second end and vertically above the second end and relative to the belt conveyor.

2. The belt conveyor system of claim 1 wherein the dispersion assembly comprises a roller that comprises longitudinal fins positioned underneath the second end to broadly disperse the bulk material onto the pile.

3. The belt conveyor system of claim 2 wherein the roller rotates the longitudinal fins.

4. The belt conveyor system of claim 1 wherein the dispersion assembly comprises a roller that spins on an axis.

5. The belt conveyor system of claim 1 further comprising a second hopper wherein the first hopper and the second hopper are located on opposite sides of the belt conveyor and wherein the belt conveyor receives material from the first hopper and the second hopper at the same time.

6. The belt conveyor system of claim 1 further comprising a first chain feed at least partially inside the first hopper and a second chain feed at least partially inside a second hopper, wherein the first chain feed and the second chain feed guide the bulk material onto the belt conveyor.

7. The belt conveyor system of claim 1 further comprising a wheel assembly and a wheeled support structure that support the belt conveyor.

8. The belt conveyor system of claim 7 wherein the wheel assembly is located at the first end of the belt conveyor and the wheeled support structure is located near a longitudinal center of belt conveyor.

9. The belt conveyor system of claim 7 wherein the wheel assembly comprises a motorized wheel configured to move the belt conveyor system in a path that corresponds to a longitudinal orientation of the belt conveyor.

10. The belt conveyor system of claim 7 wherein the wheeled support structure comprises a steering mechanism that positions the belt conveyor.

11. The belt conveyor system of claim 1, further comprising a self-propelled motorized wheel.

12. The belt conveyor system of claim 1 further comprising an operator's station.

13. The belt conveyor system of claim 1, wherein the bulk material is biomass.

14. A belt conveyor apparatus for projecting bulk material onto a pile having a smooth profile, the belt conveyor apparatus comprising:
    a dispersion assembly located at an unload end of a conveyor, the dispersion assembly comprises a dispersion roller and a structure that adjustably increases or decreases a distance between the unload end and the dispersion assembly in a horizontal direction and moves the dispersion assembly between a nearly level position relative to the conveyor and a position above the unload end.

15. The belt conveyor apparatus of claim 14, further comprising a hydraulic motor that supplies power to the dispersion roller.

16. The belt conveyor apparatus of claim 14, wherein the dispersion roller has longitudinal fins that engage and throw the bulk material.

17. The belt conveyor apparatus of claim 16, wherein the longitudinal fins are positioned underneath the conveyor.

18. The belt conveyor apparatus of claim 14, wherein the dispersion roller spins on an axis.

19. The belt conveyor apparatus of claim 18, wherein the dispersion roller spins at a variable rotational speed.

20. The belt conveyor apparatus of claim 14, further comprising a dual hopper system located at an input end of the conveyor.

21. The belt conveyor apparatus of claim 14, wherein the bulk material is biomass.

22. The belt conveyor apparatus of claim 20, the dual hopper system comprises a first hopper and at least a second hopper, wherein the conveyor receives material from the first hopper and the second hopper at the same time.

23. The belt conveyer apparatus of claim 20, further comprising a one drag chain feed that conveys material to the conveyer from at least one hopper of the dual hopper system.

24. The belt conveyer apparatus of claim 14, wherein the structure attaches the dispersion assembly to the conveyor.

* * * * *